United States Patent [19]
Watanabe

[11] 3,935,158

[45] Jan. 27, 1976

[54] ROAD MARKING PAINT COMPOSITIONS

[75] Inventor: Koichi Watanabe, Kawasaki, Japan

[73] Assignee: Nippon Zeon Co. Ltd., Tokyo, Japan

[22] Filed: Aug. 23, 1974

[21] Appl. No.: 499,825

[30] Foreign Application Priority Data
Aug. 28, 1973  Japan .............................. 48-96428

[52] U.S. Cl. ........ 260/42.21; 260/42.24; 260/42.47; 260/42.52; 260/889; 260/998.19
[51] Int. Cl.² ....................... C08K 3/20; C08K 3/30
[58] Field of Search ......... 260/998.19, 42.52, 42.21, 260/42.24, 889, 42.47

[56] References Cited
UNITED STATES PATENTS

| | | | |
|---|---|---|---|
| 3,093,601 | 6/1963 | Gessler et al. ................. | 260/998.19 |
| 3,248,359 | 4/1966 | Maloney .......................... | 260/42.46 |
| 3,541,188 | 11/1970 | Srail .................................... | 260/889 |
| 3,663,663 | 5/1972 | McAda ............................ | 260/897 B |
| 3,679,626 | 7/1972 | Tanekusa et al .............. | 260/998.19 |

*Primary Examiner*—James H. Derrington
*Attorney, Agent, or Firm*—Frank J. Jordan

[57] ABSTRACT

Hot-melt type road marking paint compositions comprising as essential thermoplastic resin components at least one aliphatic hydrocarbon resin and at least one ethylene-vinyl ester copolymer in combination.

5 Claims, No Drawings

ROAD MARKING PAINT COMPOSITIONS

This invention relates to a novel hot-melt road marking paint composition and more particularly to a hot-melt road marking paint composition comprising as thermoplastic resin components both at least one aliphatic hydrocarbon resin and at least one ethylene-vinyl ester copolymer.

There have heretofore been known spontaneously drying type, hot-spray type, melt bonding type and other type paint compositions as road marking paint compositions for painting roads to form thereon road marking or signs for lanes, pedestrians' crossings and the like. Among these conventional paint compositions, the so-called melt bonding paint composition is a normally solid and solvent-free type, one which contains as essential components a thermoplastic resin adn a pigment and also contains, for example, a plasticizer, stabilizer, antioxidant and filler as well as glass beads as required. When the paint composition of this conventional type is to be used in the formation of, for example, thick film-type road marking such as indicating lines, this is accomplished by melting the paint composition at temperatures of as high as 150°–250°C, applying the molten composition to a road surface so that it forms the desired shape and then allowing the applied composition to cool. When the melt bonding type paint composition is used in the formation of road marking or signs in such a manner as mentioned above, the composition coated on a road will be cooled spontaneously and solidified in only several minutes. Thus the use of such paint compositions in the formation of road marking will make shorter the period of time for which traffic must be suspended due to the formation of the road marking, thereby rendering it very advantageous to use the compositions in forming road marking on roads on which traffic is heavy.

The melt bonding type paint compositions to be used as materials for road marking are required not only to have such properties as drying property, wear resistance and diffusive reflectivity, which satisfy the requirements provided in JIS (Japanese Industrial Standard)-K 5665 but also to be excellent in properties not provided in JIS, such as workability during their use in forming road signs and peel strength after solidification. Heretofore, it has been reported that the thermoplastic resins which may be used as one of the components of the conventional melt bonding type road marking paint compositions include maleic-modified (maleinized) rosins, alkyd resins, polyesters and epoxy resins, with maleinized rosins being the most preferable.

However, the maleinized rosins have recently been in short supply, apt to be raised in price and increasingly difficult to procure due to the fact that the rosin used for the maleinized rosins is a naturally occuring material. There have thus been sought hydrocarbon resins, which can be obtained more easily at a lower cost, as substitutes for the maleinized rosins. However, melt bonding type paint compositions containing a hydrocarbon resin as the thermoplastic resin component are remarkably inferior in fluidity when melted and are therefore inconvenient to handle in making road markings therewith. Moreover, they will not give coatings or films having a satisfactorily smooth surface even if they be formed to the coatings or films. The coatings are further disadvantageous in that they are unsatisfactory in impact strength and flexibility and are brittle. Thus, said paint compositions containing the hydrocarbon resin have not been put to practical use as a road marking paint composition.

Attempts have been made by the present inventor to eliminate or reduce such disadvantages of the melt bonding type paint composition which contains hydrocarbon resin and, as a result, it has been found that melt bonding type paint compositions wherein the combined use of at least one hydrocarbon resin and at least one ethylene-vinyl ester copolymer is made as the thermoplastic resins, exhibit remarkably improved properties as compared with those wherein the single use of at least one hydrocarbon resin is made, thus accomplishing this invention.

The primary object of this invention is to provide melt bonding type road marking paint compositions which will have a satisfactory fluidity when melted and will exhibit an excellent workability when used for making road markings therewith.

Another object of this invention is to provide melt bonding type road marking paint compositions wherein a less expensive and easily available hydrocarbon resin or resins are used.

These objects may be accomplished by compounding, by weight, 100 parts of an aliphatic hydrocarbon resin, 2.5–40 parts of an ethylene-vinyl ester copolymer, 20–100 parts of a pigment and 80–500 parts of a filler to form a hot-melt type road marking paint composition.

The paint compositions of this invention may be produced by using, as the thermoplastic resin components, 100 parts by weight of at least one aliphatic hydrocarbon resin and 2.5–40, preferably 5–30 parts by weight of at least one ethylene-vinyl ester copolymer. If less than 2.5 parts by weight of the ethylene-vinyl ester copolymer are used in the melt bonding type road marking paint compositions to be produced, the resulting paint compositions will not exhibit an improved fluidity when melted nor will they give coatings having an improved impact strength and flexibility, thereby rendering the paint compositions undesirable as such. If, on the other hand, more than 40 parts by weight of the ethylene-vinyl ester copolymer are used, the resulting road marking paint compositions will exhibit an improved fluidity but give coatings having a reduced hardness and a decreased wear resistance as well as tackiness on the surface, thereby making the paint compositions unsuitable as such.

The hot-melt (or melt bonding) type road marking paint compositions contain, in addition to said specified thermoplastic resin components, one or more conventionally used pigments and fillers.

The pigments which may be used include white-colored inorganic pigments such as titanium dioxide ($TiO_2$), rutile calcium composite pigment ($TiO_2$ + $CaSO_4$), zinc oxide (ZnO), leaded zince oxide (ZnO + $2PbSO_4.PbO$), zinc sulfide (ZnS), lithopone (ZnS + $BaSO_4$), antimony trioxide ($Sb_2O_3$), basic carbonate white lead ($2PbCO_3.Pb(OH)_2$), basic sulfate white lead ($2PbSO_4·PbO$) and basic silicate white lead ($SiO_2$ + $PbO·SO_3$ + $PbO·SiO_2$), and also include yellow-colored inorganic and organic pigments such as lead chromate ($PbCrO_4$), cadmium sulfide (CdS) and benzidine yellow. The amounts of these pigments used are in the range of from 20 to 100, preferably 30 to 80, parts by weight per 100 parts by weight of the aliphatic hydrocarbon resin used. The use of the pigment in amounts less than said lowest one (20 parts by weight) will not lead to the production of road marking paint compositions having a clear white or yellow color.

The fillers which may be used in this invention include calcium carbonate, barium sulfate, aluminum hydroxide, silica powder, diatomaceous earth, kaolinite, talc, mica, asbestos, calcined clay and organophilic bentonite. They are used in amounts of 80–500, preferably 100–400, parts by weight per 100 parts by weight of the aliphatic hydrocarbon resin.

The fillers when used in the paint compositions are effective in increasing the strength of coatings formed of the paint compositions and in retaining the thickness of the coatings; however, the use of the fillers in unduly large amounts will result in the production of brittle coatings and, therefore, it is necessary to use the fillers in amounts of not more than 500 parts by weight.

Now, it is known that a mixture of an aliphatic hydrocarbon resin and a polyolefin or an ethylene-vinyl acetate copolymer is useful as a melt bonding type adhesive (see Japanese Patent Gazette No. 26639/71). This adhesive is being widely used, for example, for coating the surface of plastic films and metals therewith; however, it very often contains a thermoplastic resin, such as a polyolefin or ethylene-vinyl acetate copolymer, in a major proportion and a hydrocarbon resin in a minor proportion. In addition, the adhesive need not contain a pigment in large amounts, in view of its nature as an adhesive.

The melt bonding type road marking paint compositions have the primafacie same composition as those melt bonding type adhesives heretofore known. However, the melt bonding type adhesive of Japanese Patent Gazette No. 26639/71 wherein polyethylene, polypropylene or polybutene is used as the thermoplastic resin employed in combination with the hydrocarbon resin, will exhibit an effect or performance equal to that exhibited by the adhesive of said Patent Gazette wherein an ethylene-vinyl acetate copolymer is used as the thermoplastic resin; while in a melt bonding type road marking paint composition containing each of a pigment and filler in a large amount and also containing a hydrocarbon resin in a major proportion as compared with the other thermoplastic resin contained in the same paint composition, the use of polyethylene, polypropylene, polybutene, polystyrene, phenol resin or terpene resin as the said other thermoplastic resin other than ethylene-vinyl ester copolymers will not lead to the production of a paint composition exhibiting an improved fluidity when melted as the paint composition of this invention.

The hydrocarbon resins which may be used in this invention are aliphatic ones obtained by cationically polymerizing unsaturated hydrocarbons comprising a $C_5$ fraction as the main ingredients by conventional methods. The $C_5$ fraction used herein is typically a mixture comprising monoolefins and conjugated diolefins, the mono- and diolefins boiling between 30° and 45°C and including as polymerizable monomers 1,3-pentadiene, cyclopentene, 2-methylbutene-2, isoprene, pentene-1, pentene-2 and cyclopentadiene. The $C_5$ fractions include those obtained as the by-products from napththa cracking isoprene synthesizing using dehydration or propylene dimerization techniques, and extracting isoprene from $C_5$ fractions, and further include sub-fractions and isolated individual ingredients obtained from said fractions by distillation, extraction, extractive distillation and the like. The $C_5$ fractions still further include mixtures containing at least two of said sub-fractions and isolated individual ingredients in desired ratios.

In addition, the aliphatic hydrocarbon resins which are useful in this invention may be copolymers obtained by copolymerizing the polymerizable monomers contained in the $C_5$ fraction with other monomers copolymerizable therewith. Such other copolymerizable monomers are illustrated by butene-1, isobutene, butadiene, diisobutylene, styrene, α-methylstyrene, indene and terpenes and, in the hydrocarbon resins, these copolymerizable monomers are required to be present in a minor proportion as compared with the polymerizable monomers contained in the $C_5$ fraction. If such requirement is not met in an aromatic hydrocarbon resin containing the aromatic monomers as the main ingredients, paint compositions containing the aromatic hydrocarbon resin will exhibit an inferior fluidity when melted, whereby they will not attain the object of this invention.

The aliphatic hydrocarbon resins which may be used in this invention should be those having a softening point of from 70° to 160°C, preferably 80°–140°C. If paint compositions contain an aliphatic hydrocarbon resin having a softening point of lower than 70°C, they will exhibit a satisfactory fluidity but will give coatings which decrease in hardness after solidified, thereby rendering the paint compositions unsuitable as road marking ones. The hydrocarbon resins according to this invention are not particularly required to have any other specified properties although it is recommended that they should have usually a Gardner color of not higher than 8 (ASTM D. 1544-63T) and an iodine value of 20–200 (Wijs method).

On the other hand, the ethylene-vinyl ester copolymers which may be used in this invention are those comprising 90–50% by weight of ethylene and 10–50% by weight of a vinyl ester and having a melt index of 1.5–1000 (g/10 min.). The vinyl esters used for the formation of the ethylene-vinyl ester copolymers include vinyl esters represented by the formula

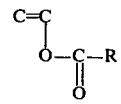

wherein R is an alkyl group having one to four carbon atoms, such as vinyl acetate, vinyl propionate, vinyl butyrate and vinyl valerianate, with vinyl acetate being the most recommendable.

The melt bonding type road marking paint compositions of this invention may be incorporated with plasticizers, stabilizers, antioxidants, glass beads to improve the resulting coatings in reflection, and the like. In the case where the paint composition contains less than 10 parts by weight of the ethylene-vinyl ester copolymer per 100 parts by weight of the hydrocarbon resin, it is particularly preferable that the paint composition be incorporated with a plasticizer. The plasticizer is usually added in amounts of not more than 30 parts by weight per 100 parts by weight of hydrocarbon resin and is illustrated by customarily used in animal, vegetable and mineral oils and synthetic oils, such as liquid paraffin, a phthalic acid ester and castor oil. Even if one or more of these plasticizers are incorporated into melt bonding type road marking paint compositions containing a hydrocarbon resin as the only thermoplastic resin, the paint compositions will not be improved at all in fluidity. In contrast, the paint compositions containing the ethylene-vinyl ester copolymer in combination with the hydrocarbon resin can be further improved in fluidity by incorporating one or more of the aforesaid plasticizers in the paint compositions.

Heretofore, various hot-spray type road marking paint compositions have been developed. These compositions are generally combined with wax in such amounts that they may be sprayed due to their decrease in viscosity. However, if the melt bonding type road marking paint compositions of this invention are combined with wax, the resultant wax combined compositions will disadvantageously exhibit no improved fluidity when melted and give coatings which are brittle and have a decreased bond strength.

The melt bonding type paint compositions of this invention are used for forming road marking by any of the following methods.

The paint compositions may be prepared by firstly melting the hydrocarbon resin and the ethyl-vinyl ester copolymer and then combining the melted mixture with the pigment and filler, by firstly mixing the hydrocarbon resin with the pigment and filler and then incorporating the resulting mixture slowly in the ethylene-vinyl ester copolymer in a molten form, or by mixing together the hydrocarbon resin, ethylene-vinyl ester copolymer, pigment and filler and then melting the resulting mixture. The thus-prepared paint composition in a molten form is coated on roads by the use of paint applicators and allowed to cool for forming desired road marks or signs. The melt bonding type road marking paint compositions of this invention will exhibit, when melted, a fluidity approximately equal to that of the conventional ones containing as the thermoplastic resin a maleinised (or maleic-modified) rosin which has heretofore been the most highly recommendable for this purpose. They are very workable or can easily be handled in forming road signs therewith owing to their excellent fluidity obtained when melted and they will also give thick-film type coatings having an excellent impact strength and flexibility.

This invention will be more fully explained by reference to the following examples in which all parts and percentages are by weight unless otherwise specified.

EXAMPLES 1 – 4 (and COMPARATIVE EXAMPLES 1 – 3)

A $C_5$ fraction containing 80 parts of 1,3-pentadiene, 20 parts of cyclopentene and small amounts of incidental other $C_5$ hydrocarbons was subjected to a cationic polymerization in benzene in the presence of aluminum chloride thereby to obtain an aliphatic hydrocarbon resin having a softening point of 100°C. Portions of the thus-obtained hydrocarbon resin were combined, respectively, with other materials, such as ethylene-vinyl acetate copolymers, pigments, fillers and, as desired, plasticizers, in accordance with the formulations shown in Table 1. The resulting mixtures were heated and melted at a temperature of about 260°C for 30 minutes thereby obtaining the corresponding homogeneous paint compositions.

For comparison, in accordance with the formulations shown in Table 1, there were also prepared other mixtures such as a mixture containing no ethylene-vinyl acetate copolymer and a mixture containing a conventionally recommended maleinised rosin (softening point : 90°C) in place of the hydrocarbon resin. The resulting mixtures were heated and melted under the same conditions as mentioned above thereby to obtain the corresponding homogeneous paint compositions.

Fifty grams of each of the paint compositions so obtained were put in a 100-ml beaker and kept at 260°C. The mass, kept at 260°C in the beaker held 30 cm above a 2mm thick iron plate, was then dropped to the iron plate thereby allowing the mass to spread thereon for testing for fluidity from the degree and state of spreading. The mass dropped on the iron plate was allowed to cool and rapidly formed thereon a coating shaped like a generally circular cake. The coating or cake so formed was bent for its flexibility. The other masses were treated and tested in the same manner as above. The results are indicated in Table 1.

Table 1

| Materials for paint composition | Example 1 | Example 2 | Example 3 | Example 4 | Comparative example 1 | Comparative example 2 | Comparative example 3 |
|---|---|---|---|---|---|---|---|
| Hydrocarbon resin(Parts) | 100 | 100 | 100 | 100 | 100 | 100 | — |
| Elvax 210[1] | 5 | 10 | — | — | — | — | — |
| Elvax 260[2] | — | — | 20 | 30 | — | — | — |
| Maleinised rosin | — | — | — | — | — | — | 100 |
| Calcium carbonate | 300 | 300 | 300 | 300 | 300 | 300 | 300 |
| Titanium dioxide | 75 | 75 | 75 | 75 | 75 | 75 | 75 |
| Castor oil | — | — | — | — | — | 20 | 20 |
| Liquid paraffin | 15 | 15 | — | — | 30 | — | — |
| Fluidity Diameter (cm) | 4.5 | 5.0 | 5.0 | 5.5 | 3.5 | 3.5 | 5.5 |
| Appearance of the surface of cake | Smooth | Smooth | Smooth | Smooth | Uneven | Smooth | |
| Flexibility | Flexible | Flexible | Flexible | Flexible | Brittle | Brittle | Flexible |

[1]Ethylene-vinyl acetate copolymer having a vinyl acetate content of 28% and a melt index of 400
[2]Ethylene-vinyl acetate copolymer having a vinyl acetate content of 28% and a melt index of 6

From the results shown in the Table it is seen that the use of the hydrocarbon resin in combination with the castor oil or liquid paraffin in the paint composition will very little improve the composition in fluidity when melted, while the use thereof in combination with the ethylene-vinyl acetate copolymer in the composition will remarkably improve the composition in fluidity when melted.

EXAMPLE 5 (and COMPARATIVE EXAMPLE 4)

The paint compositions prepared in Example 2 and Comparative example 3 were incorporated with glass beads in such an amount that the bead-incorporated compositions would contain the beads in the amount of 20%, respectively. These bead-incorporated compositions were tested for their properties in accordance with the method prescribed in JIS K-5665 with the results being shown in Table 2. The same test was attempted to be made on the paint composition prepared in Comparative example 2; however, it was found impossible to prepare test pieces from the composition due to its remarkably inferior fluidity when melted.

mark, Toho Hiresin No. NX; softening point, 100°C; manufacturer, Toho Chemical Industry Co., Ltd.) in Table 2

| Paint composition | Example 5 | Comparative example 4 | JIS (Japanese Industrial Standard) |
|---|---|---|---|
| Specific gravity | 2.0 | 2.0 | 1.8 – 2.3 |
| Softening point(°C) | 103 | 95 | 80 or higher |
| Non-adhesive drying property | Satisfactory | Satisfactory | Paint composition should not adhere to tires in three minutes. |
| Appearance of coating | Satisfactory | Satisfactory | Absence of creases, unevenness, blisters, cracks and peel |
| 45°,0° Diffusive reflection factor (White) | 83 | 84 | 75 or more |
| Wear resistance | 90 | 92 | 200 mg or less/100 times |
| Compressive strength(kg/cm²) | 399 | 487 | 120 or higher |
| Alkalinity resistance | Satisfactory | Satisfactory | None of cracks and discoloration should not appear after 18 hrs' immersion in saturated solution of calcium hydroxide. |
| Solvent-insoluble matter (%) | 80 | 80 | 70 – 85 |
| Content of glass beads (%) | 20 | 20 | 20 – 23 |

From the results of Table 2, it is seen that the melt bonding type road marking paint compositions of this invention successfully meet the requirements prescribed in JIS K-5665 and have properties approximately equal to those of the commercial paint compositions containing the conventionally recommendable maleinized rosin.

EXAMPLES 6 – 7 (and COMPARATIVE EXAMPLES 5 and 6)

The paint compositions used in these Examples were those containing a commercially available aliphatic hydrocarbon resin in substitution for the hydrocarbon resin used in Examples 1 – 4 and they were those prepared in accordance with the formulations indicated in Table 3. They were also tested under the same conditions as used in Examples 1 to 4 with the results being shown in Table 3.

From the results of Table 3 it is seen that the paint compositions of this invention will be equally effective as road marking paint compositions even if these compositions respectively contain different hydrocarbon resins as far as they contain such hydrocarbon resin in combination with the ethylene-vinyl ester copolymer.

Table 3

| Materials for paint composition | Examples | | Comparative examples | |
|---|---|---|---|---|
| | 6 | 7 | 5 | 6 |
| Hirez - T - 100 X*³(Parts) | 100 | — | 100 | — |
| Escorez 1102B*⁴ | — | 100 | — | 100 |
| Ethylene-vinyl acetate copolymer*¹ | 10 | 10 | — | — |
| Calcium carbonate | 300 | 300 | 300 | 300 |
| Titanium (dioxide) | 75 | 75 | 75 | 75 |
| Castor oil | — | — | 20 | 20 |
| Liquid paraffin | 15 | 15 | — | — |
| Fluidity Diameter (cm) | 5.0 | 5.5 | 3.5 | 3.0 |
| Appearance of the surface of cake | Smooth | Smooth | Uneven | Uneven |
| Flexibility | Flexible | Flexible | Brittle | Brittle |

*³Aliphatic hydrocarbon resin having a softening point of 100°C, produced by Mitsui Petrochemical Co., Ltd.

*⁴Aliphatic hydrocarbon resin having a softening point of 100°C, produced by Tonen Petrochemical Co., Ltd.

COMPARATIVE EXAMPLE 7

Paint compositions prepared in accordance with the formulations indicated in Table 4 and consequently containing an aromatic hydrocarbon resin (Trade substitution for the aliphatic hydrocarbon resin, were tested under the same conditions as in Examples 1–4.

Table 4

| Materials for paint composition | Comparative example | |
|---|---|---|
| | 7 | 12 |
| Aromatic hydrocarbon resin (Parts) | 100 | 100 |
| Ethylene-vinyl acetate copolymer*¹ | — | 10 |
| Calcium carbonate | 300 | 300 |
| Titanium (dioxide) | 75 | 75 |
| Castor oil | 20 | — |
| Liquid paraffin | — | 15 |
| Fluidity Diameter (cm) | 3.5 | 3.5 |
| Appearance of the surface of cake | Uneven | Uneven |

From the results shown in Table 4, it is apparent that the use of the aromatic hydrocarbon resin even in combination with the ethylene-vinyl acetate copolymer in the paint composition will not improve the composition in fluidity.

COMPARATIVE EXAMPLES 8 – 16

Comparative paint compositions were prepared in accordance with the formulations indicated in Table 5 and consequently they contained the hydrocarbon resin as used in Examples 1 – 4 in combination with the compounds other than the ethylene-vinyl acetate polymer. They were then tested under the same test conditions as used in Examples 1 – 4 with the result that each of them exhibited a diameter of as small as about 3.5 – 4.0 cm as an indicator for its fluidity and frequently formed a cake or coating thereof the surface of which is non-smooth and uneven.

Table 5

| Materials for paint composition | Comparative example | | | | | | | | |
|---|---|---|---|---|---|---|---|---|---|
| | 8 | 9 | 10 | 11 | 12 | 13 | 14 | 15 | 16 |
| Hydrocarbon resin | 100 | 100 | 100 | 100 | 100 | 100 | 100 | 100 | 100 |
| Calcium carbonate | 300 | 300 | 300 | 300 | 300 | 300 | 300 | 300 | 300 |
| Titanium dioxide | 75 | 75 | 75 | 75 | 75 | 75 | 75 | 75 | 75 |
| Liquid paraffin 77.2 cst at 100°F | 15 | — | 15 | — | 15 | — | 15 | 15 | — |
| Low molecular weight polyethylene (softening point: 220°F) | 10 | 20 | — | — | — | — | — | — | — |
| Atactic polypropylene (M.W. 12000 – 19000) | — | — | 10 | 20 | — | — | — | — | — |
| Polybutene (M.W. 910) | — | — | — | — | 10 | 20 | — | — | — |
| Polyvinyl chloride (Degree of polymerization: 700) | — | — | — | — | — | — | 10 | — | — |
| Low molecular polystyrene (Trade Mark: Dicelastyrene of Dai Nippon Ink Chemistry Co., Ltd.) | — | — | — | — | — | — | — | 10 | — |
| Paraffin wax (m.p. 130°F) | — | — | — | — | — | — | — | — | 20 |

The results in Table 5 show that the use of the hydrocarbon resin together with a compound other than the ethylene-vinyl ester copolymers will not give satsifactory results.

What is claimed is:

1. A hot-melt type road marking wax-free paint composition comprising, by weight, 100 parts of at least one aliphatic hydrocarbon resin having a softening point of 70°–160°C and being a cationically polymerized polymer of unsaturated hydrocarbons comprising a $C_5$ fraction as the main ingredients, 2.5–40 parts of at least one ethylene-vinyl ester copolymer having a melt index of 1.5–1,000 g/10 minutes and being a copolymer of 90–50% by weight of ethylene and 10–50% by weight of at least one vinyl ester, 20–100 parts of at least one pigment, and 80–500 parts of at least one filler.

2. A hot-melt type road marking wax-free paint composition according to claim 1, wherein the ethylene-vinyl ester copolymer, the pigment and the filler are present in amounts by weight of 5–30 parts, 30–80 parts, and 100–400 parts, respectively.

3. A hot-melt type road marking paint composition according to claim 1, wherein the vinyl ester is a member selected from the group consisting of vinyl acetate, vinyl propionate, vinyl butyrate and vinyl valerianate.

4. A hot-melt type road marking paint composition according to claim 1, wherein the pigment is a white-colored pigment selected from the group consisting of titanium dioxide, zinc oxide, leaded zinc oxide, zinc sulfide, lithopone, antimony trioxide, rutile calcium composite pigment, basic carbonate white lead, basic carbonate white lead, basic sulfate white lead and basic silicate white lead.

5. A hot-melt type road marking paint composition according to claim 1, wherein the pigment is a yellow-colored pigment selected from the group consisting of lead chromate, cadmium sulfide and benzidine yellow.

* * * * *